United States Patent
Kim

(10) Patent No.: US 10,061,431 B2
(45) Date of Patent: Aug. 28, 2018

(54) VEHICLE HEAD UNIT AND METHOD FOR OPERATING THE SAME

(71) Applicant: Hyundai Motor Company, Seoul (KR)

(72) Inventor: Yong Kim, Seongnam, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 15/260,235

(22) Filed: Sep. 8, 2016

(65) Prior Publication Data

US 2017/0168647 A1    Jun. 15, 2017

(30) Foreign Application Priority Data

Dec. 11, 2015 (KR) .................. 10-2015-0176687

(51) Int. Cl.
  *G06F 3/041* (2006.01)
  *B60R 11/02* (2006.01)

(52) U.S. Cl.
  CPC ........ *G06F 3/0416* (2013.01); *B60R 11/0229* (2013.01); *B60R 11/0235* (2013.01)

(58) Field of Classification Search
  CPC ............. B60R 11/0229; B60R 2300/20; B60R 25/102; G06F 3/0416; B60K 2350/1004; B60K 2350/352; B60K 2350/1028; B60K 2350/357

See application file for complete search history.

(56) References Cited

U.S. PATENT DOCUMENTS

| | | | |
|---|---|---|---|
| 9,300,779 B2* | 3/2016 | Langlois | H04M 1/6091 |
| 9,553,967 B2* | 1/2017 | Langlois | H04M 1/6091 |
| 2014/0277843 A1* | 9/2014 | Langlois | H04M 1/6091 701/2 |
| 2016/0202850 A1* | 7/2016 | Langlois | H04M 1/6091 715/771 |
| 2017/0127112 A1* | 5/2017 | Hoshihara | H04N 21/41422 |

FOREIGN PATENT DOCUMENTS

| | | |
|---|---|---|
| JP | H11161426 A | 6/1999 |
| JP | 2013-242836 A | 12/2013 |
| JP | 2013-242916 A | 12/2013 |
| JP | 2014-182602 | 9/2014 |
| KR | 2011-0082881 A | 7/2011 |
| KR | 2013-0030961 A | 3/2013 |
| KR | 2014-0103777 A | 8/2014 |
| KR | 2014-182602 A | 9/2014 |
| KR | 10-2005-0114279 A | 10/2015 |

* cited by examiner

*Primary Examiner* — Xuemei Zheng
(74) *Attorney, Agent, or Firm* — Mintz Levin Cohn Ferris Glovsky and Popeo, P.C.; Peter F. Corless

(57) ABSTRACT

A vehicle head unit to execute an applied application relating to a connectivity service includes: a device driver configured to provide a touch signal including coordinate information of a position touched by a user on a display of the vehicle head unit; and a touch event software accelerator configured to determine whether the touch signal is a signal for controlling the applied application based on the coordinate information and configured to transmit the touch signal to a user terminal according to the determination.

17 Claims, 3 Drawing Sheets

VEHICLE HEAD UNIT AND METHOD FOR OPERATING THE SAME

CROSS-REFERENCE TO RELATED APPLICATION

This application claims the benefit of and priority to Korean Patent Application No. 10-2015-0176687, filed on Dec. 11, 2015, which is hereby incorporated by reference as if fully set forth herein.

BACKGROUND OF THE DISCLOSURE

Technical Field

The present disclosure relates generally to a vehicle head unit and a method for operating the same, and more particularly, to a vehicle head unit which provides a connectivity service with a terminal.

Discussion of the Related Art

Connectivity technology for vehicles involves technology in which communication and personalized information services may be more efficiently and conveniently used. In the case of a vehicle, connectivity can be established between a vehicle head unit and a user terminal (e.g., a smartphone). Application of connecting a user terminal, which may be a modern extension of the body, with a vehicle head unit to actual life is expected to be widespread.

For example, content stored in a user terminal may be output through a display of a vehicle head unit, and the vehicle head unit and the user terminal may be connected to each other through a remote area mobile communication network, e.g., so that the current position of the vehicle may be detected in real-time even in a vehicle theft or traction situation.

As another example, if an application program executed in a user terminal is displayed through a display of a vehicle head unit, a user input signal inputted through a touch device of the vehicle head unit needs to be transmitted to the user terminal. In order to transmit the user input signal, inputted to the touch device of the vehicle head unit, to the user terminal, latency within the vehicle head unit is typically encountered in addition to network latency between the user terminal and the vehicle head unit.

Latency within the vehicle head unit increases via an operating system (OS) and a framework. Such increase in latency may lower responsiveness of a connectivity-related application program and thus deteriorate the user experience.

SUMMARY OF THE DISCLOSURE

Accordingly, the present disclosure is directed to a vehicle head unit and a method for operating the same that substantially obviate one or more problems due to limitations and disadvantages of the related art.

An object of the present disclosure is to provide a vehicle head unit, which may minimize latency when a connectivity service is provided, and a method for operating the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a vehicle head unit to execute an applied application relating to a connectivity service includes: a device driver configured to provide a touch signal including coordinate information of a position touched by a user on a display of the vehicle head unit; and a touch event software accelerator configured to determine whether the touch signal is a signal for controlling the applied application based on the coordinate information and configured to transmit the touch signal to a user terminal according to the determination.

Furthermore, according to embodiments of the present disclosure, a method for operating a vehicle head unit, which executes an applied application relating to a connectivity service, includes: providing, by a device driver, a touch signal including coordinate information of a position touched by a user on a display of the vehicle head unit; determining, by a touch event software accelerator, whether the touch signal is a signal for controlling the applied application based on the coordinate information; and transmitting, by the touch event software accelerator, the touch signal to a user terminal according to the determination.

Furthermore, according to embodiments of the present disclosure, a vehicle head unit to execute an applied application relating to a connectivity service includes: a device driver configured to provide a touch signal including coordinate information of a position touched by a user on a display of the vehicle head unit; the applied application which is configured to generate application state information corresponding to operation state information of the display; and a touch event software accelerator configured to determine whether to transmit the touch signal to a user terminal based on the coordinate information and the application state information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the embodiments of the present disclosure, examples of which are illustrated in the accompanying drawings. The suffixes "module" and "unit" used in the description below are given or used together only in consideration of ease in preparation of the specification and do not have distinctive meanings or functions.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one vehicle head unit controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
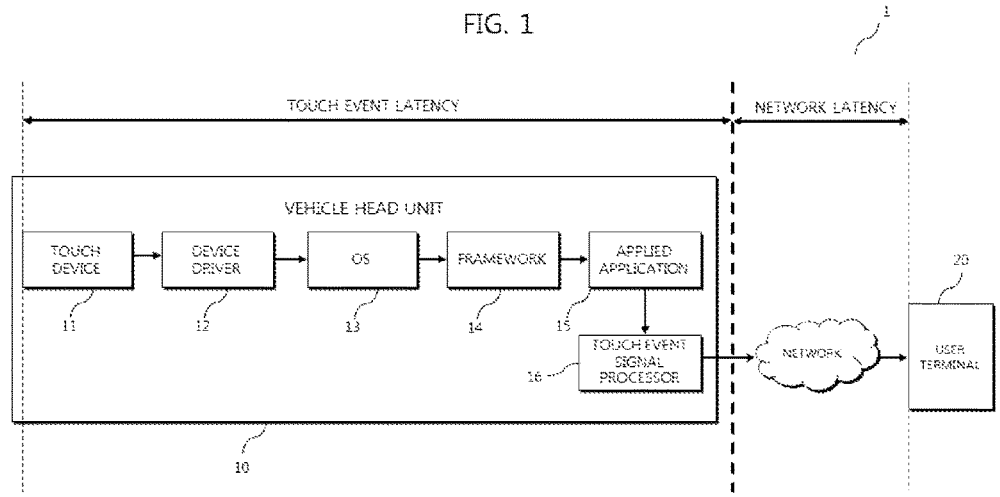
FIG. 1 is a block diagram illustrating a connectivity system in accordance with a comparative example.

Referring now to the disclosed embodiments of the present disclosure, FIG. 1 is a block diagram illustrating a connectivity system in accordance with a comparative example.

As shown in FIG. 1, a connectivity system 1 includes a vehicle head unit 10 and a user terminal 20, and may provide a connectivity service in which the vehicle head unit 10 and the user terminal 20 may be operated as an input/output device of the counterpart using connectivity between the vehicle head unit 10 and the user terminal 20.

Hereinbelow, the case in which the vehicle head unit 10 is operated as an input/output device of the user terminal 20 will be described for demonstration purposes.

The vehicle head unit 10 is an apparatus installed in a vehicle to provide a wide range of services, such as an air conditioning service, a multimedia service, e.g., audio, video, and navigation functions, a connectivity service of the vehicle with an arbitrary terminal, and the like, and may include a touch device 11, a device driver 12, an operating system (OS) 13, a framework 14, an applied application 15, and a touch event signal processor 16.

The touch device 11 is a device to directly receive a user input signal and may be implemented as a touch pad or a touch panel overlapping a display panel. The touch device 11 may generate coordinate information of a position touched by a user (e.g., x- and y-coordinates) and information regarding a touch type based on the coordinate information, and provide the generated information to the device driver 12.

The coordinate information means two-dimensional (2D) coordinate information of a position where user touch is carried out in a region of the touch device 11 which may receive user input, and the touch type information means information regarding the kind of touch (e.g., long touch, continuous touch, multi-touch, etc.).

The device driver 12 is a program to drive the touch device 11 and executes a function of transmitting the coordinate information and the touch type information to the OS 13 and transmitting signals between the touch device 11 implemented as hardware and the OS 13 implemented as software.

The OS 13 refers to a program to control the hardware of the vehicle head unit 10, to provide base environments for the applied application 15 and to serve as a mediator via which a user may use the vehicle head unit 10. That is, the OS 13 may control the touch device 11, implemented as hardware, through the device driver 12 and provide base environments to execute the applied application 15.

The OS 13 may receive the coordinate information and the touch type information from the device driver 12 and transmit the coordinate information and the touch type information to the applied application 15 through the framework 14.

The framework 14 provides classes of a collaborative type so that design and implementation corresponding to detailed parts of the applied application 15 are reusable so as to execute the applied application 15 on the OS 13.

The applied application 15 involves a program which is executed on the OS 13 and may be executed (or terminated) by a user. The applied application 15 may be a connectivity applied application based on connectivity with the user terminal 20 and a general applied application operated within the vehicle head unit 10 regardless of connectivity with the user terminal 20. If the applied application 15 is a connectivity applied application, the applied application 15 may receive data (e.g., image data or voice data) from the user terminal 20 and output the corresponding data to an output unit (e.g., a display or a speaker) through the OS 13 so that the vehicle head unit 10 may be operated as the output device of the user terminal 20. Further, the applied application 15 may receive data (e.g., a touch signal) from an input unit, such as the touch device 11, and output the corresponding data to the user terminal 20 so that the vehicle head unit 10 may be operated as an input device of the user terminal 20.

The applied application 15 may receive the coordinate information and the touch type information, determine whether (or not) the touch signal corresponds to a touch event to control the applied application 15 by confirming a display state and a display region of the applied application 15 based on the coordinate information, and prevent the coordinate information and the touch type information from being transmitted to the user terminal 20 through the touch event signal processor 16 as a result of determination. For example, when the applied application 15 is a music application, and the music application and a navigation application are simultaneously displayed on the display, if the touch event relates to the navigation application (i.e., if the display region of the navigation application is touched), the applied application 15 may not transmit the corresponding touch event to the user terminal 20 through the touch even signal processor 16.

Further, the applied application 15 may correct the coordinate information by confirming the display region of the applied application 15. For instance, in a case where a navigation application is executed in the left region of the display, and a music application is executed in the right region of the display, if a user inputs a touch signal of touching the uppermost end of the left region of the music application, the coordinate information includes coordinates indicating the uppermost end of the central region, and thus, conversion of the coordinates into coordinates indicating the uppermost end of the left region by confirming the display region of the music application is required.

The touch event signal processor 16 may receive the coordinate information and the touch type information and transmit the received coordinate information and touch type information to the user terminal 20 through a network. That is, the touch event signal processor 16 may execute a function of converting the coordinate information and the touch type information into a protocol which is transmittable to the network. The network may be a wired or wireless network and, for example, a network of a universal serial bus (USB), Wi-Fi, or Bluetooth type.

The user terminal 20 may be a portable terminal, a smartphone, a tablet PC or a notebook, and a connectivity applied application may be installed and executed in the user terminal 20 so that the user terminal 20 may use the vehicle head unit 10 as an input/output device based on data communication with the vehicle head unit 10.

Particularly, if the user terminal 20 uses the vehicle head unit 10 as an input device, considerable latency is generated from input of a touch signal to the touch device 11 of the vehicle head unit 10 by a user until the touch signal is transmitted to the user terminal 20. Such latency include touch event latency while the touch signal passes through the inner elements 11 to 16 of the vehicle head unit 10 and network latency generated in the network between the vehicle head unit 10 and the user terminal 20. Here, as the touch signal (i.e., the coordinate information and the touch type information) is processed through the OS 13, the framework 14, and the applied application 15 of the vehicle head unit 10, latency increases and such latency lowers responsiveness of connectivity-related application programs and thus causes lowering of user experience.

A method for directly transmitting the touch signal from the device driver 12 to the network may be considered. However, such a method may cause problems as described below.

First, the applied application 15 of the vehicle head unit 10 shown in FIG. 1 determines the display state and transmits a corresponding signal to the user terminal 20 only if the touch signal corresponds to a touch event to control the applied application 15. But when the device driver 12 directly transmits the touch signal to the network, unnecessary signal transmission is carried out even if the touch event does not correspond to a touch event to control the applied application 15. Thus, the connectivity applied application 15 of the user terminal 20 may malfunction.

Second, the applied application 15 of the vehicle head unit 10 shown in FIG. 1 determines the display state and corrects the coordinate information and thus accurate coordinates of a touched position of the display region may be provided. But when the device driver 12 directly transmits the touch signal to the network, malfunction of the connectivity applied application 15 of the user terminal 20 may be caused due to inaccurate coordinate information.

Figure 2:
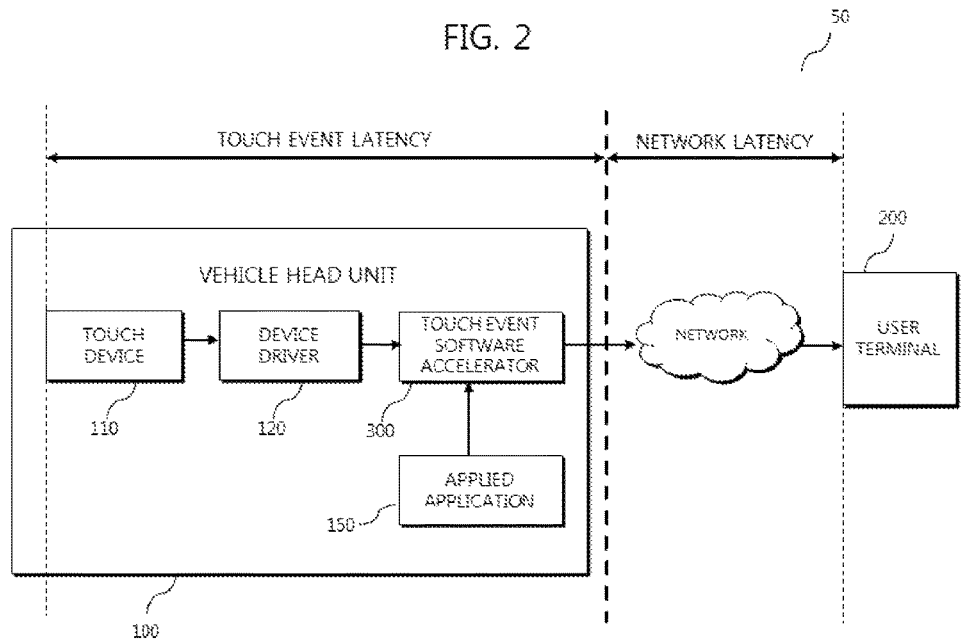
FIG. 2 is block diagram illustrating a connectivity system in accordance with embodiments of the present disclosure.
Figure 3:
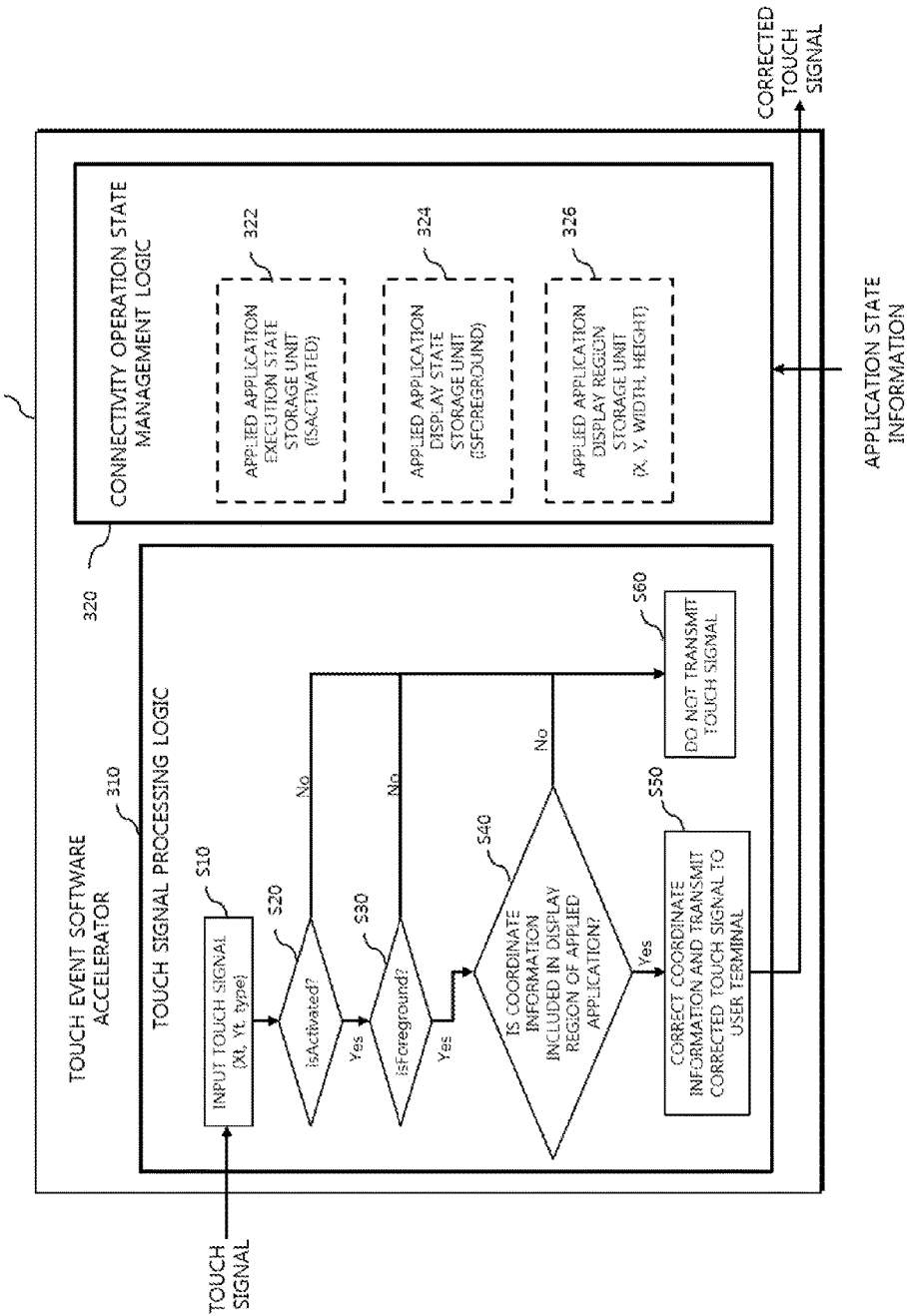
FIG. 3 is a view illustrating a touch event software accelerator shown in FIG. 2 in additional detail.
Figure 4:
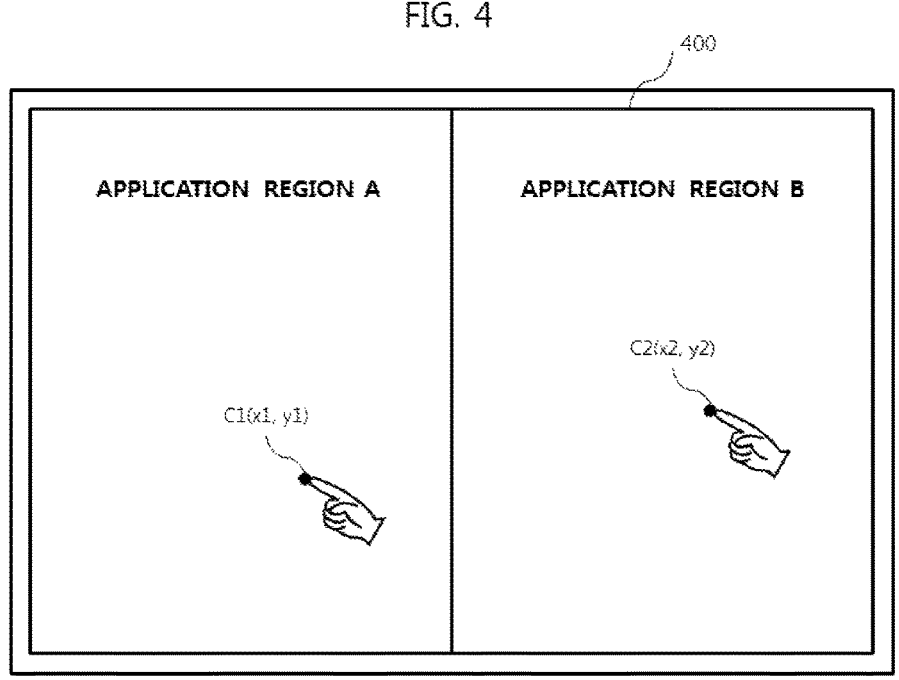
FIG. 4 is a view illustrating operation of a touch signal processing logic shown in FIG. 3.

FIG. 2 is block diagram illustrating a connectivity system in accordance with embodiments of the present disclosure, FIG. 3 is a view illustrating a touch event software accelerator shown in FIG. 2 in additional detail, and FIG. 4 is a view illustrating operation of a touch signal processing logic shown in FIG. 3.

With reference to FIGS. 1 to 4, a connectivity system 50 includes a vehicle head unit 100 and a user terminal 200 and has substantially the same configuration and operation as the connectivity system 1 shown in FIG. 1 except for differences which will be described later.

Although FIG. 2 illustrates the vehicle head unit 100 as including only elements necessary to transmit a touch input signal, input to a touch device 110, to the user terminal 200 connected to the vehicle head unit 100 by a network, the vehicle head unit 100 may further include elements to execute services relating to an air conditioning system, a navigation system, a multimedia system, and the like within a vehicle.

In additional detail, the touch device 110 and a device driver 120 may execute substantially the same operations as the touch device 11 and the device driver 12 of FIG. 1 but transmit a touch signal, including coordinate information and touch type information according to user touch input, to a touch event software accelerator 300 not to the OS 13.

The touch event software accelerator 300 is software executed independently of the OS 13 and, if a touch signal occurs, may determine whether the touch signal is a touch signal for controlling an applied application 150 relating to the connectivity service and then rapidly transmit the touch signal to the user terminal 20 without processing through an OS, a framework, and an application.

The touch event software accelerator 300 may include touch signal processing logic 310 and connectivity operation state management logic 320.

The touch signal processing logic 310 may receive a touch signal from the device driver 120, determine the execution state, display state, and display region of the applied application 15, and determine whether the received touch signal corresponds to a touch event to control the applied application 15. Further, even upon determining that the touch signal corresponds to a touch event to control the applied application 15, the touch signal processing logic 310 may determine the display region of the applied application 15, correct the coordinate information included in the touch signal, and transmit the corrected touch signal to the user terminal 200.

The touch signal processing logic 310 may execute an algorithm shown in FIG. 3 when the touch signal is input to the touch signal processing logic 310. The algorithm may include Operation S10 to Operation S60.

The touch signal may include coordinate information and touch type information, the coordinate information may be 2-dimensional coordinates (Xt, Yt: Xt and Yt being X- and Y-coordinates of a touch point) and the touch type information may be information regarding a kind of touch stated in FIG. 1.

When the touch signal processing logic 310 receives a touch signal (Operation S10), the touch signal processing logic 310 may determine whether the touch signal is a touch signal to control the applied application 150 through Operation S20 to Operation S40 with reference to the coordinate information and the connectivity operation state management logic 320.

The connectivity operation state management logic 320 may receive application state information from the applied application 150 and store the received application state information.

The application state information includes information regarding the operation state of the applied application 150 relating to the display of the vehicle head unit 100 and may include an execution state (isActivated) indicating whether the applied application 150 is currently being executed, a display state (isForeground) indicating whether the applied application 150 is currently being displayed on the display, and a display region (x, y, width, height) regarding the position of a region of the display where the applied application 150 is currently being displayed.

Here, the execution state (isActivated) and the display state (isForeground) may be information of a bit unit which may be expressed as 0 (i.e., not executed or not displayed) or 1 (i.e., executed or displayed), but the disclosure of the present disclosure is not limited thereto. The display region (x, y, width, height) may be information including an x-coordinate (x) at which the display region starts, a horizontal length (width) of the display region, a y-coordinate (y) at which the display region starts and a vertical length (height) of the display region, but the disclosure of the present disclosure is not limited thereto.

The applied application 150, if at least one of the execution state (isActivated), the display state (isForeground) and the display region (x, y, width, height) is changed, may update the changed information in the connectivity operation state management logic 320.

The connectivity operation state management logic 320 may include an applied application execution state storage unit 322 to store the execution state (isActivated), an applied application display state storage unit 324 to store the display state (isForeground), and an applied application display region storage unit to store the display region (x, y, width, height).

When the touch signal is input to the touch signal processing logic 310, the touch signal processing logic 310 may detect whether the applied application 150 is currently being executed with reference to the applied application execution state storage unit 322 (Operation S20) and, if it is detected that the applied application 150 is not currently being executed (No of Operation S20), skip transmission of the touch signal to the user terminal 200 (Operation S60). The reason for this is that, since the applied application 150 is not executed, there is no possibility that the touch signal corresponds to a touch event to control the applied application 150, and thus, unnecessary signal transmission needs to be prevented.

If it is detected that that the applied application 150 is currently being executed (Yes of Operation S20), the touch signal processing logic 310 may detect whether the applied application 150 is currently being displayed on the display with reference to the applied application display state storage unit 324 (Operation S30) and, if it is detected that the applied application 150 is not currently being displayed on the display (No of Operation S30), skip transmission of the touch signal to the user terminal 200 (Operation S60). The reason for this is that, since the applied application 150 is not displayed on the display, there is no possibility that the touch signal corresponds to a touch event to control the applied application 150, and thus, unnecessary signal transmission needs to be prevented.

If it is detected that that the applied application 150 is currently being displayed on the display (Yes of Operation S30), the touch signal processing logic 310 may detect whether or not the touch signal indicates the region where the applied application 150 is currently being displayed with reference to the applied application display region storage unit 326 (Operation S40) and, if it is detected that the touch signal does not indicate the region where the applied application 150 is currently being displayed (No of Operation S40), skip transmission of the touch signal to the user terminal 200 (Operation S60). The reason for this is that, if the touch signal does not indicate the region where the applied application 150 is displayed, the touch signal does not correspond to a touch event to control the applied application 150, and thus, unnecessary signal transmission needs to be prevented.

That is, the touch signal processing logic 310, if the x-coordinate (Xt) of the touch signal is located between the x-coordinate (x) at which the display region of the applied application 150 starts and an x coordinate (x+width), acquired by adding the horizontal length (width) of the display region to the x-coordinate (x) ($x \leq Xt \leq x+width$: hereinafter, referred to as "first condition") and the y-coordinate (Yt) of the touch signal is located between the y-coordinate (y) at which the display region of the applied application 150 starts and a y-coordinate (y+height), acquired by adding the vertical length (height) of the display region to the y-coordinate (y) ($y \leq Yt \leq y+height$: hereinafter, referred to as "second condition"), execute Operation S50, which will be described later.

On the other hand, if any one of the above-described first condition and second condition is not satisfied, the touch signal processing logic 310 skips transmission of the touch signal to the user terminal 200 (Operation S60). The reason for this is that, if even any one of the above-described first condition and second condition is not satisfied, the touch signal indicates a part of the applied application 150 except for the display region.

FIG. 4 illustrates a display 400 of the vehicle head unit 100. Here, the touch device 110 overlapping the display 400 and thus forming a touchscreen is provided and it is assumed that an application region A, in which a first applied application is displayed, and an application region B, in which a second applied application is displayed, are displayed on the display 400.

Further, a first position C1 and a second position C2 represent positions touched by a user and respectively have coordinates (x1, y1) and coordinates (x2, y2).

If the applied application 150 is not executed (in a first case) or if the applied application 150 is executed but the applied application 150 is not displayed on the display 400, i.e., the applied application 150 is executed as a background (in a second case), even though a user touches any one of the first position C1 and the second position C2, a corresponding touch signal is not transmitted to the user terminal 200 through Operation S20 and Operation S30.

However, if the applied application 150 is displayed in the application region A and a general application is displayed in the application region B (in a third case), the applied application 150 is executed and displayed in the application region A, and thus, even if a user touches any one of the first position C1 and the second position C2, the corresponding touch signal may undergo Operation S40 via Operation S20 and Operation S30.

If a touch signal corresponding to the first position C1 is input to the touch signal processing logic 310, the applied application 150 is displayed in the application region A and thus the position information (x1, y1) of the first position C1 included in the application region A may satisfy both the first condition and the second condition. Therefore, the touch signal corresponding to the first position C1 may be transmitted to the user terminal 200 via Operation S50.

However, if a touch signal corresponding to the second position C2 may be input to the touch signal processing logic 310, the applied application 150 is displayed in the application region A and thus the position information (x2, y2) of the second position C2 included in the application region B does not satisfy both the first condition and the second condition. Therefore, the touch signal corresponding to the second position C2 is not transmitted to the user terminal 200.

If the touch signal indicates the region in which the applied application 50 is currently being displayed (Yes of Operation S40), the touch signal processing logic 310 may determine the display region stored in the applied application display region storage unit 326 and correct the coordinate information of the input touch signal. This may mean conversion of the coordinate information of the display 400 into the coordinate information of the applied application 150. The corrected coordinate information and touch type information may be referred to as a corrected touch signal.

After generation of the corrected touch signal, the touch signal processing logic 310 may convert the corrected touch signal into a protocol transmittable over the network and then transmit the protocol to the user terminal (Operation S50). That is, although the touch signal processing logic 310 may execute the function of the touch event signal processor 16 of FIG. 1, the disclosure of the present disclosure is not limited thereto, and the touch event signal processor 16 may be separately implemented at the outside of the touch event software accelerator 300.

As is understood from the comparison between touch event latency of FIG. 1 and touch event latency of FIG. 2, in accordance with a vehicle head unit 100 in accordance with embodiments of the present disclosure, a touch signal does not pass through an OS, a framework and an applied application, but whether or not the touch signal is a signal to control an applied application relating to a connectivity service is verified, and then, the touch signal is transmitted to a user terminal 200. Therefore, responsiveness of connectivity-related application programs may be improved and user experience may be enhanced.

As apparent from the above description, a method for operating the vehicle head unit 100 may be implemented in a computer readable recording as computer readable code. The computer readable recording medium may be any kind of recording medium in which data readable by a computer system is stored. For example, computer readable recording media include a read only memory (ROM), a random access memory (RAM), a magnetic tape, a magnetic disk, a flash memory, an optical data storage device, etc. Further, the computer readable recording medium may be stored and implemented as code which is distributed to computer systems connected by a computer communication network and is readable in a distributed manner.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A vehicle head unit to execute an applied application relating to a connectivity service, the vehicle head unit comprising:
   a device driver configured to provide a touch signal including coordinate information of a position touched by a user on a display of the vehicle head unit; and
   a touch event software accelerator configured to determine whether the touch signal is a signal for controlling the applied application based on the coordinate information and configured to transmit the touch signal to a user terminal according to the determination,
   wherein the touch event software accelerator includes a connectivity operation state management logic configured to store an execution state indicating whether the applied application is currently being executed, and the touch event software accelerator is further configured to skip the transmission of the touch signal upon determining that the applied application is not currently being executed based on the execution state.

2. The vehicle head unit according to claim 1, wherein the connectivity operation state management logic is further configured to store: a display state indicating whether the applied application is currently being displayed on the display of the vehicle head unit, and a display region indicating a region of the display where the applied application is currently being displayed.

3. The vehicle head unit according to claim 2, wherein the touch event software accelerator is further configured to skip the transmission of the touch signal upon determining that the applied application is not currently being displayed on the display of the vehicle head unit based on the display state.

4. The vehicle head unit according to claim 2, wherein the touch event software accelerator is further configured to skip the transmission of the touch signal upon determining that the coordinate information is not included in the region of the display where the applied application is currently being displayed based on the display region.

5. The vehicle head unit according to claim 2, wherein the touch event software accelerator is further configured to convert the coordinate information of the display into a coordinate information of the applied application if the touch signal indicates the display region in which the applied application is currently being displayed.

6. The vehicle head unit according to claim 1, wherein the touch event software accelerator is executed independently of an operating system (OS) of the vehicle head unit.

7. A method for operating a vehicle head unit, which executes an applied application relating to a connectivity service, the method comprising:
   providing, by a device driver, a touch signal including coordinate information of a position touched by a user on a display of the vehicle head unit;
   determining, by a touch event software accelerator, whether the touch signal is a signal for controlling the applied application based on the coordinate information;
   storing, by the touch event software accelerator, an execution state indicating whether the applied application is currently being executed;
   transmitting, by the touch event software accelerator, the touch signal to a user terminal according to the determination; and
   skipping by the touch event software accelerator, the transmission of the touch signal upon determining that the applied application is not currently being executed based on the execution state.

8. The method according to claim 7, further comprising:
   storing, by the touch event software accelerator, a display state indicating whether the applied application is currently being displayed on the display of the vehicle head unit, and a display region indicating a region of the display where the applied application is currently being displayed.

9. The method according to claim 8, further comprising:
skipping, by the touch event software accelerator, the transmission of the touch signal upon determining that the applied application is not currently being displayed on the display of the vehicle head unit based on the display state.

10. The method according to claim 8, further comprising:
skipping, by the touch event software accelerator, the transmission of the touch signal upon determining that the coordinate information is not included in the region of the display where the applied application is currently being displayed based on the display region.

11. The method according to claim 8, further comprising:
converting, by the touch event software accelerator, the coordinate information of the display into a coordinate information of the applied application if the touch signal indicates the display region in which the applied application is currently being displayed.

12. The method according to claim 7, wherein the touch event software accelerator is executed independently of an OS of the vehicle head unit.

13. A vehicle head unit to execute an applied application relating to a connectivity service, the vehicle head unit comprising:
a device driver configured to provide a touch signal including coordinate information of a position touched by a user on a display of the vehicle head unit;
the applied application which is configured to generate application state information corresponding to operation state information of the display; and
a touch event software accelerator configured to determine whether to transmit the touch signal to a user terminal based on the coordinate information and the application state information, wherein the application state information includes an execution state indicating Whether the applied application is currently being executed, and the touch event software accelerator is further configured to skip the transmission of the touch signal upon determining that the applied application is not currently being executed based on the execution state.

14. The vehicle head unit according to claim 13, wherein the application state information further includes: a display state indicating whether the applied application is currently being displayed on the display of the vehicle head unit, and a display region indicating a region of the display where the applied application is currently being displayed.

15. The vehicle head unit according to claim 14, wherein the touch event software accelerator is further configured to skip the transmission of the touch signal upon determining that the applied application is not currently being displayed on the display of the vehicle head unit based on the display state.

16. The vehicle head unit according to claim 14, wherein the touch event software accelerator is further configured to skip the transmission of the touch signal upon determining that the coordinate information is not included in the region of the display where the applied application is currently being displayed based on the display region.

17. The vehicle head unit according to claim 14, wherein the touch event software accelerator is further configured to convert the coordinate information of the display into a coordinate information of the applied application if the touch signal indicates the display region in which the applied application is currently being displayed.

* * * * *